US011737455B2

United States Patent
Gednalske et al.

(10) Patent No.: US 11,737,455 B2
(45) Date of Patent: Aug. 29, 2023

(54) DRIFT REDUCTION ADJUVANTS AND METHODS OF USING THE SAME

(71) Applicant: WinField Solutions, LLC, Arden Hills, MN (US)

(72) Inventors: Joe V. Gednalske, River Falls, WI (US); Jason Roth, Constantine, MI (US); Andrea Clark, River Falls, WI (US); Lillian C. Magidow, River Falls, WI (US)

(73) Assignee: WinField Solutions, LLC, Arden Hills, MN (US)

( * ) Notice: Subject to any disclaimer, the term of this patent is extended or adjusted under 35 U.S.C. 154(b) by 234 days.

(21) Appl. No.: 17/081,487

(22) Filed: Oct. 27, 2020

(65) Prior Publication Data

US 2021/0127665 A1 May 6, 2021

Related U.S. Application Data

(60) Provisional application No. 62/928,906, filed on Oct. 31, 2019.

(51) Int. Cl.
*A01N 25/04* (2006.01)
*A01N 57/20* (2006.01)
*C09K 17/18* (2006.01)
*C09K 17/20* (2006.01)
*C09K 17/22* (2006.01)

(52) U.S. Cl.
CPC .............. *A01N 25/04* (2013.01); *A01N 57/20* (2013.01); *C09K 17/18* (2013.01); *C09K 17/20* (2013.01); *C09K 17/22* (2013.01)

(58) Field of Classification Search
None
See application file for complete search history.

(56) References Cited

U.S. PATENT DOCUMENTS

| 10,334,842 | B1 | 7/2019 | Modaressi et al. |
| 2009/0270259 | A1* | 10/2009 | Auweter ............... A01N 25/28 514/772.3 |
| 2011/0245374 | A1* | 10/2011 | Barnes ................... C08L 83/04 524/588 |
| 2016/0262375 | A1 | 9/2016 | Raman et al. |
| 2018/0184647 | A1 | 7/2018 | Bissell et al. |
| 2020/0138017 | A1* | 5/2020 | Teo ........................ A01N 25/04 |

FOREIGN PATENT DOCUMENTS

| CN | 101170903 A | * | 4/2008 | ............. A01N 25/04 |
| WO | 2013134035 A1 | | 9/2013 | |

OTHER PUBLICATIONS

Extended European search report received for European Application No. 20205041.5, dated Oct. 22, 2021, 9 pages.
"Enlist One with Colexd Technology; Herbicide" Specimen Label, Dow Agro Sciences, revised May 16, 2019, 7 pages., May 16, 2019.
Shao, Hui et al., "Spray Drift Reduction Through Formulation Innovation", Proc. ISAA; Dow AgroSciences LLC, 9330 Zionsville Road, Indianapolis, IN, 2013, pp. 263-268.

* cited by examiner

*Primary Examiner* — Charles R Nold
(74) *Attorney, Agent, or Firm* — Dorsey & Whitney LLP

(57) ABSTRACT

Reducing fines from an agricultural spray dispensed from a nozzle is provided in the disclosed methods. The agricultural spray comprises water, an agricultural composition such as a pesticide, at least one oil emulsion drift reduction adjuvant, and at least one spontaneous emulsion drift reduction adjuvant. The agricultural spray exhibits fewer fine droplets having a diameter less than about 105 μm, about 150 μm, and/or about 210 μm compared to an agricultural spray neither or only one of the oil emulsion drift reduction adjuvant and the spontaneous emulsion drift reduction adjuvant.

17 Claims, No Drawings

DRIFT REDUCTION ADJUVANTS AND METHODS OF USING THE SAME

CROSS-REFERENCE TO RELATED APPLICATIONS

The present application claims priority to U.S. Provisional Patent Application No. 62/928,906, filed Oct. 31, 2019, entitled "Drift Reduction Adjuvants and Methods of Using the Same," which is hereby incorporated herein by reference in its entirety.

TECHNICAL FIELD

The present disclosure relates to drift reduction adjuvant compositions and systems and methods of using the same in agricultural spray applications.

BACKGROUND

Crop protection and cultivation practices commonly involve the application of agricultural sprays. These sprays may contain a variety of components including pesticides for combatting pests such as insects, weeds, and fungus. However, these pesticides can cause environmental problems when the agricultural spray experiences drift and fails to reach the intended target. This has raised an increasing level of concern about pest control costs and environmental pollution associated with agricultural sprays. As a result, application of such sprays requires precision and care. Considerable research on spray drift has been conducted, but it remains a major problem associated with many agricultural spray applications. Consequently, there is a need to provide drift reduction technologies for use with agricultural sprays.

SUMMARY

Implementations provide methods of reducing fines from an agricultural spray. In some implementations, this method involves spraying the agricultural spray containing water, at least one oil emulsion drift reduction adjuvant, at least one spontaneous emulsion drift reduction adjuvant, and at least one agricultural composition, where the agricultural spray exhibits fewer fine droplets having a diameter less than about 210 μm than a substantially similar agricultural spray that does not include either or both of the at least one oil emulsion drift reduction adjuvant or the spontaneous emulsion drift reduction adjuvant.

In various implementations and alternatives, the agricultural spray is sprayed from a nozzle.

In various implementations and alternatives, at least one oil emulsion drift reduction adjuvant includes an oil selected from the group consisting of vegetable oil, modified vegetable oil, seed oil, modified seed oil ("MSO"), modified soybean oil, modified palm oil, modified rapeseed oil, crop oil concentrate, petroleum hydrocarbons, mineral oil, paraffinic oil, naphthenic oil, aromatic oil, emulsified petroleum distillates, unsaturated fatty acids, paraffin oil, tall oil, phytoblend-based oil, and tallow oil. In such implementations and alternatives, the oil is vegetable oil or modified vegetable oil.

In various implementations and alternatives, oil emulsion drift reduction adjuvant is present at about 0.05% to about 0.5% v/v.

In various implementations and alternatives, the spontaneous emulsion drift reduction adjuvant comprises a Pickering emulsion component. In such implementations and alternatives, the Pickering emulsion component comprises one or more of carnauba wax, paraffin/ethylene acrylic acid copolymer, polyethylene, paraffin wax, ethylene acrylic acid copolymer, and styrene-butadiene latex. The spontaneous emulsion drift reduction adjuvant may be present at about 1% to about 5% v/v.

The spontaneous emulsion drift reduction adjuvant may include a pesticide, such as an added pesticide. In such implementations the pesticide may be a herbicide comprising glufosinate or glufosinate ammonium.

In various implementations and alternatives, the agricultural composition includes at least one alkyl ether sulfate or a salt thereof. In such implementations and alternatives, the alkyl ether sulfate or salt thereof includes sodium lauryl ether sulfate.

In various implementations and alternatives, the fine droplets have a diameter less than about 150 μm. In such implementations and alternatives, the fine droplets have a diameter less than about 105 μm.

Another method of reducing drift of an agricultural spray involves dispensing the agricultural spray from a nozzle, where the agricultural spray contains water, at least one oil emulsion drift reduction adjuvant present at about 0.05% to about 0.5% v/v of the agricultural spray, at least one spontaneous emulsion drift reduction adjuvant present at about 1% to about 5% v/v of the agricultural spray, and at least one agricultural composition comprising at least one pesticide, where the agricultural spray exhibits fewer fine droplets having a diameter less than about 210 μm than a substantially similar agricultural spray that does not include either or both of the at least one oil emulsion drift reduction adjuvant or the at least one spontaneous emulsion drift reduction adjuvant.

In various implementations and alternatives, the pesticide is an herbicide and the agricultural composition includes a surfactant. In such implementations and alternatives, the surfactant is an alkyl ether sulfate.

A method of applying an agricultural spray, according to certain embodiments, involves admixing water, an agricultural composition, and a drift reduction adjuvant composition, the drift reduction adjuvant composition including at least one oil emulsion drift reduction adjuvant comprising at least one oil emulsion; and at least one spontaneous emulsion drift reduction adjuvant; and applying the agricultural spray to a target location, where the agricultural spray exhibits at least 40% fewer fine droplets having a diameter less than about 210 μm than a substantially similar agricultural spray that does not include either or both of the at least one oil emulsion drift reduction adjuvant or the at least one spontaneous emulsion drift reduction adjuvant.

In various implementations and alternatives, the agricultural spray exhibits at least 50% fewer fine droplets having a diameter less than about 150 μm than a substantially similar agricultural spray that does not include both of the at least one oil emulsion drift reduction adjuvant or the at least one spontaneous emulsion drift reduction adjuvant.

DETAILED DESCRIPTION

Within agricultural field applications, disadvantageous spray attributes exist. Often, fine droplets are produced which are susceptible to off-target drift. Driftable fine droplets ("driftable fines") are defined by the ASTM as those having a droplet diameter less than 105 μm, and may be measured as a percentage of a spray volume in that size class (v105). Driftable fines may additionally or alternatively be less than 150 µm (v150) or less 210 µm (v210), as droplets falling below these sizes may be considered subject to drift. Driftable fines can deposit on unintended plant surfaces causing injury or harm to the vegetation. Furthermore, traditional measures of reducing the spray volume composition of fine droplets, by way of nozzle design or chemical adjuvant additive, often increases the volume composition of extra-large droplets (e.g., v622 or ultra-coarse droplets >622 μm). Significantly high rates of ultra-coarse droplets having a diameter greater than 622 μm diminishes the area coverage of the agrochemical pesticide product. Reduced area coverage has been linked to reduced efficacy of the product performance, and the evolution of chemical-resistance in commonly-treated weed species. In either case, significant quantities of fine or ultra-coarse droplets within the spray volume can hinder the performance of the applied agrochemical products.

Each component of an agricultural spray may affect the droplet size of the spray. The droplet size of a spray can be managed (i.e., the number of smaller particles are reduced) by adding adjuvant compositions to the agricultural spray. The adjuvant composition may be a drift reduction adjuvant. Some agricultural compositions are susceptible to producing high volume percentages of fines and include herbicides such as Liberty® 280 SL (Bayer CropScience, Research Triangle Park, N.C.), Roundup®, Dual Magnum® and Warrant®. The addition of a known drift reduction adjuvant may not satisfactorily reduce the percentage of fines in sprays including the susceptible agricultural compositions.

I. Drift Reduction Adjuvant Compositions

The drift reduction adjuvant compositions (also known as drift reduction adjuvants and drift reduction technology, drift and deposition aids, or drift additives) disclosed herein can be generally understood as including at least one oil emulsion and at least one spontaneous emulsion drift reduction adjuvant (e.g., the drift reduction emulsion contained in Enlist One® or Enlist Duo®). In some embodiments, the oil emulsion and/or the spontaneous emulsion drift reduction adjuvant is provided as part of pre-made drift reduction adjuvant, such as a commercially available drift reduction adjuvant (e.g., Enlist One® or Enlist Duo®).

a) Oil Emulsion

The at least one oil emulsion or oil emulsion drift reduction adjuvant includes at least one oil. The oil may be one or more of vegetable oil, modified vegetable oil, seed oil, modified seed oil ("MSO"), modified soybean oil (e.g., soybean oil methyl ester, methyl soyate)), modified palm oil, modified rapeseed oil, crop oil concentrate, petroleum hydrocarbons, mineral oil, paraffinic oil, naphthenic oil, aromatic oil, emulsified petroleum distillates, unsaturated fatty acids, paraffin oil, tall oil (e.g., fatty acids of tall oil), phytoblend-based oil, or tallow oil (e.g., tallow fatty acid amine ethoxylated). Modified oils may include oils that are, for instance, methylated, ethylated, propylated, or butylated.

The at least one oil emulsion or oil emulsion drift reduction adjuvant includes at least one emulsifier. The emulsifier may promote dispersion in aqueous or oil solutions. The emulsifier may be one or more of a surfactant; non-ionic surfactant; anionic surfactant; cationic surfactant; petroleum oil, tall oil-based surfactants (e.g., fatty acids of tall oil); alkyl phenol ethoxylate; ethoxylated alcohol; lecithin (e.g., soy lecithin); modified alkanoate; alkylphenol ethoxylate phosphate ester; dimethylpolysiloxane, glycerol, alcohol ethoxylate; alkyl polysaccharides; polyoxyethylene sorbitol; polyoxyethylene sorbitan emulsifiers, including polyoxyethylene sorbitan fatty acid esters, polyoxyethylene 20 sorbital trioleate, polyoxyethylene sorbitan mixed fatty acid esters, polyoxyethylene sorbitan monolaurate, polyoxyethylene sorbitan monooleate, polyoxyethylene sorbitan monopalmitate, polyoxyethylene sorbitan monostearate, polyoxyethylene sorbitan monotallate, polyoxyethylene sorbitol hexaoleate, polyoxyethylene sorbitol oleate-laurate, polyoxyethylene sorbitol penta tall oil ester (40 moles), polyoxyethylene sorbitol tetraoleate, and polyoxyethylene sorbitol, mixed ethyl ester, and variations and combinations of two or more of any of the foregoing.

Anionic surfactants may be crop-derived surfactants (e.g., derived from corn and/or rapeseed) capable of emulsifying methyl esters, such as C18-C22 methyl esters. The surfactant may be dispersible in water and soluble in organic solvents. Example anionic surfactants include polyoxyethylene sorbitan emulsifiers, including those provided herein, alone or in combination with vegetable oil. Additional or alternative surfactants include linear alkylbenzene sulfonate salt, branched alkylbenzene sulfonate, ethoxylated fatty alcohols, ethoxylated castor oil, ethoxylated/propoxylated alcohols and copolymers, ethoxylated fatty acids, sorbitan ester, polysorbate, ethoxylated fatty amine, ethoxylated tristyrylphenol, ethoxylated phosphate esternolamide, ethoxylated nonylphenol, tallow amine ethoxylated, tallow amine, naphthalene sulfonate formaldehyde condensate, alcohol alkoxylate, and tristyrylphenol alkoxylate. The surfactant may include a solvent such as isobutyl alcohol (CAS #78-83-1) or alkyl benzylsulfonic acid, calcium salt (CAS #84989-14-0).

Non-ionic surfactants may be crop-derived surfactants, such as commercially available surfactants including but not limited to alkyl polysaccharide emulsifiers. Some examples of commercially available surfactants are Agrimul PG 2069® (Henkel Corporation, Ambler, Pa.); APG 325® (BASF Corporation, Florham Park, N.J.); and AT Plus 438® (Uniqema Surfactant, Wilmington, Del.); APG 911 and APG 810 (Adjuvants Unlimited). Agrimul PG 2069® is an alkyl polyglycoside non-ionic surfactant and includes alkyl polyglycoside polymers with alkyl chains of nine carbons in a concentration of 20% by weight, ten carbon atoms in a concentration of 40 wt % and eleven carbon atoms in a concentration of 40% wt %. The alkyl polyglycoside, APG 325® has an average degree of polymerization of 1.6, and is considered a non-ionic surfactant. It is non-gelling, biodegradable and soluble in dispersions of high salt concentrations. AT Plus 438® is an alkyl polysaccharide based on glucose and fatty alcohols derived from plant sources. Other non-ionic surfactants may include phosphate esters.

A suitable oil emulsion drift reduction adjuvant may include, based on 100 parts by weight of the adjuvant, (a) greater than about 50 parts by weight of at least one alkyl fatty acid ester, (b) from about 2 parts by weight to less than about 5 parts by weight of a surfactant comprising: (b)(i) one or more anionic surfactants selected from sulfonic acids, sulfonic acid esters, alkylsulfosuccinic acid esters, phosphate esters, sulfate esters, and oleoyltaurate salts, or (b)(ii) one or more non-ionic surfactants selected from sorbitan fatty acid esters, aryl alkoxylates, alkoxylated fatty alcohols, alkoxylated fatty acids, alkoxylated triglycerides, alkoxy copolymers, alkylpolyglucosides, alkoxylated fatty amines, and ether amines, or (iii) a mixture (b)(i) and (b)(ii). The oil emulsion drift reduction adjuvant may be substantially as described in U.S. Pat. No. 10,334,842, which is incorporated by reference in its entirety herein.

An example of a suitable commercially available oil emulsion drift reduction adjuvant is InterLock® (WinField® United). InterLock® is a crop-based adjuvant derived from vegetable oil. InterLock® may be used in conjunction with any pesticide disclosed herein, including herbicides, fungicides, and insecticides. InterLock® may also be used with desiccants and defoliants.

In some applications by ground or by air, InterLock® may reduce the amount of fine spray particles in a spray pattern without thickening the spray, keep more spray droplets within the target size range, improve spray deposition on intended targets, improves coverage, increase canopy penetration, reduce spray drift, and/or reduce evaporation of pesticides.

An oil emulsion drift reduction adjuvant may be present in a drift reduction adjuvant composition at less than 1% v/v, such as about 0.05% to about 0.5%, about 0.05% to about 0.4%, about 0.05% to about 0.3%, about 0.05% to about 0.2%, about 0.05% to about 0.1%, about 0.06% to about 0.5%, about 0.07% to about 0.5%, about 0.08% to about 0.5%, about 0.09% to about 0.5%, about 0.1% to about 0.5%, or about 0.07% to about 0.3% v/v.

The oil emulsion drift reduction adjuvant may be present in the disclosed drift reduction adjuvant compositions at a lower amount than in a substantially similar drift reduction adjuvant composition that does not also include a spontaneous emulsion drift reduction adjuvant. For example, the amount of oil emulsion drift reduction adjuvant may be up to about 80% less, such as about 5% to about 80%, about 5% to about 70%, about 5% to about 60%, about 5% to about 50%, about 5% to about 40%, about 5% to about 30%, about 5% to about 20%, about 10% to about 80%, about 20% to about 80%, about 30% to about 80%, about 40% to about 80%, about 50% to about 80%, about 60% to about 80%, or about 25% to about 75%, about 25%, about 50%, or about 75% less than a substantially similar drift reduction adjuvant composition that does not also include a spontaneous emulsion drift reduction adjuvant.

b) Spontaneous Emulsion Drift Reduction Adjuvant

The drift reduction adjuvant compositions disclosed herein also includes at least one spontaneous emulsion drift reduction adjuvant.

Spontaneous emulsion components cause an agricultural formulation to spontaneously form an oil-in-water emulsion upon dilution, such as upon dilution during the tank mix process in which agricultural components are mixed with water. In an example, a herbicide concentrate (such as 2,4-D concentrate) containing one or more spontaneous emulsion components may spontaneously form an emulsion phase in the spray mixtures upon dilution, resulting in a substantial reduction of spray drift.

Pickering emulsions are one type of emulsifier that forms a spontaneous emulsion and may be a spontaneous emulsion drift reduction adjuvant. A Pickering emulsion is stabilized by solid particles at an oil-water interface. The particles may be organic particles, inorganic particles, or mixtures. Examples of Pickering emulsion components may include but are not limited to: fats (e.g., fat crystals), polymers, carnauba wax, paraffin/ethylene acrylic acid copolymer, polyethylene, paraffin wax, ethylene acrylic acid copolymer, styrene-butadiene, minerals, proteins (e.g., soy protein, whey protein), yeast, biomolecules, silica (e.g., colloidal silica, fumed silica, precipitated silica, modified or unmodified silicas), casein, polyelectrolytes, modified or unmodified latex particles, modified or unmodified clay, hydroxyapatite, linked or unlinked chitosan, cyclodextrin, modified and unmodified Iron (II, III) oxide nanoparticles, carbon nanotubes, modified and unmodified starch, zein, bacteria (e.g., lactic acid bacteria), and pigments. In some implementations, the spontaneous emulsion drift reduction adjuvant may be free of one or more of the Pickering emulsion components.

The spontaneous emulsion drift reduction adjuvant may include other components including but not limited to a pesticide as well as other agricultural components disclosed herein.

An example of a suitable commercially available spontaneous emulsion drift reduction adjuvant is contained in Enlist One® (Dow Chemical Company). Enlist One® includes a proprietary Colex-D Technology®. Enlist One® also includes the herbicide 2,4-dichlorophenoxyacetic acid as a choline salt. Another example of a suitable commercially available spontaneous emulsion drift reduction adjuvant is contained in Enlist Duo® (Dow Chemical Company). Enlist Duo® includes the proprietary Colex-D Technology®, the herbicide 2,4-dichlorophenoxyacetic acid as a choline salt, and the herbicide glyphosate. For instance, the spontaneous emulsion components in Enlist One® or Enlist Duo® may include one or more Pickering emulsion components or other spontaneous emulsion components.

A spontaneous emulsion drift reduction adjuvant may be present in a drift reduction adjuvant composition of the present disclosure at about 0.01% to about 5% v/v, about 1% to about 5% v/v, about 0.01% to about 1.0% v/v, about 1% to about 4.5% v/v, about 1% to about 4% v/v, about 1% to about 3.5% v/v, about 1% to about 3% v/v, about 1% to about 2.5% v/v, about 1.5% to about 5% v/v, about 2% to about 5% v/v, about 2.5% to about 5% v/v, about 1% to about 5% v/v, or about 1.8% to about 2.5% v/v.

The spontaneous emulsion drift reduction adjuvant may be present in the disclosed drift reduction adjuvant compositions at a lower amount than in a substantially similar drift reduction adjuvant composition that does not also include an oil emulsion or an oil emulsion drift reduction adjuvant. For example, the amount of spontaneous emulsion drift reduction adjuvant may be up to about 80% less, such as about 5% to about 80%, about 5% to about 70%, about 5% to about 60%, about 5% to about 50%, about 5% to about 40%, about 5% to about 30%, about 5% to about 20%, about 10% to about 80%, about 20% to about 80%, about 30% to about 80%, about 40% to about 80%, about 50% to about 80%, about 60% to about 80%, or about 25% to about 75%, about 25%, about 50%, or about 75% less than a substantially similar drift reduction adjuvant composition that does not also include an oil emulsion or oil emulsion drift reduction adjuvant.

c) Other Components of the Drift Reduction Adjuvant Compositions

One or more stabilizing agents may be included in the drift reduction adjuvant compositions disclosed herein. In embodiments, a stabilizing agent is provided in an oil emulsion drift reduction adjuvant and/or a spontaneous emulsion drift reduction adjuvant (e.g., contained in in Enlist One® or Enlist Duo®). The stabilizing agent may include additional surfactants, such as linear alkylbenzene sulfonate salt, branched alkylbenzene sulfonate, ethoxylated fatty alcohols, ethoxylated castor oil, ethoxylated/propoxylated alcohols and copolymers, ethoxylated fatty acids, sorbitan ester, polysorbate, ethoxylated fatty amine, ethoxylated tristyrylphenol, ethoxylated phosphate esternolamide, ethoxylated nonylphenol, tallow amine ethoxylated, tallow amine, naphthalene sulfonate formaldehyde condensate, alcohol alkoxylate, and tristyrylphenol alkoxylate. Resins or other polymers may also be included.

The drift reduction adjuvant compositions may include inert components such as solvents (e.g., isopropyl alcohol and/or isobutyl alcohol), propylene glycol, and a polysiloxane foam retardant (Si). These inert components may be nonfunctioning agents, surfactant additives, and/or formulation aids, e.g., for reducing the freezing temperature. Such inert components may be present at up to about 90% by weight of the drift reduction adjuvant composition. Other inert components may include anti-foaming agents or defoamers, which may be present in the composition and may include but are not limited to silicone-based defoamers. Antimicrobials, another category of inert components, may be present in the drift reduction adjuvant composition and may include but are not limited to 1,2-benzisothiazolin-3-one in dipropylene glycol (e.g., Proxel™ GXL, Arch Biocides, Smyrna, Ga.). In some approaches, additional adjuvants may be included in the drift reduction adjuvant composition or in a tank and may include Preference® adjuvant (WinField® United), which contains alkylphenol ethoxylate, sodium salts of soya fatty acids and isopropyl alcohol.

The drift reduction adjuvant compositions and other compositions of the present disclosure containing the drift reduction adjuvant composition may consist exclusively of the specifically recited components. In addition or alternatively, the drift reduction adjuvant compositions may be free of components disclosed herein. For instance, the drift reduction adjuvant compositions of the present disclosure may be free of one or more of the described adjuvant components or free of any of the described pesticides or additives. In addition or alternatively, the drift reduction adjuvant compositions may be free of high fructose corn syrup, alginate, lecithin, ammonium sulfate, water conditioning agents, buffering agents, coupling agents and/or antifoam agents. The recited compositions may contain various impurities, but in such amounts so as not to affect the advantageous properties of the inventive drift reduction adjuvant compositions.

The drift reduction adjuvant compositions may have a pH of about 5.5 to about 7.5, about 5.5 to about 6.5, about 6.5 to about 7.5, or about 5.5, 6.0, 6.5, 7.0, or 7.5.

II. Agricultural Compositions

The drift reduction adjuvant compositions disclosed herein can be used with any suitable agricultural composition. The agricultural composition can include at least one of a pesticide (e.g., an herbicide), a fertilizer (such as ammonium sulfate) and combinations. Examples of herbicides suitable for use with the methods disclosed herein include EPSP inhibitors such as glyphosate; glutamine synthetase inhibitors such as glufosinate; accase inhibitors such as tralkoxydim, quizalofop, diclofop, clodinafop, sethoxydim, fenoxaprop, and clethodim; membrane disruptors such as difenzoquat and paraquat; emergence inhibitors such as triallate; mitosis inhibitors such as pendimethalin, trifluralin, and ethalfluralin; ALS inhibitors such as imazamethabenz, sulfesulfuron, flucarbazone, metsulfuron, triasulfuron, tribenuron, thifensulfuron, chlorsulfuron, prosulfuron, imazapic, imazathapyr, and imazamox; growth regulators such as dicamba, 2,4-dichlorophenoxyacetic acid (choline salt), clopyralid, quinclorac, fluoxypyr, and picloram; and photosynthesis inhibitors such as atrazine, pyridate, and bromoxynil; and combinations of two or more of any of the foregoing.

An example of a suitable commercially available herbicide is Liberty® 280 SL (Bayer CropScience, Research Triangle Park, N.C.). Liberty® is a water-soluble non-selective herbicide that, when applied as a foliar spray, may control a broad spectrum of emerged broadleaf and grassy weeds. Liberty® includes the herbicide glufosinate ammonium. Liberty® also includes an alkyl ether sulfate, sodium salt surfactant. The alkyl ether sulfate may be sodium lauryl ether sulfate (also called sodium laureth sulfate or SLES).

Other examples of suitable commercially available herbicides include, but are not limited to, glufosinate ammonium-containing herbicides such as Finale® (Bayer CropScience, Research Triangle Park, N.C.), Interline® (UPL NA Inc., King of Prussia, Pa.), and Cheetah® Pro (Nufarm Americas Inc., Alsip, Ill.); Dual Magnum® (Syngenta Crop Protection LLC, Greensboro, N.C.) having the active ingredient (S)-2-chloro-N-(2-ethyl-6-methylphenyl)-N-(2-methoxy-1-methylethyl] acetamide (S-metolachlor); Warrant® (Bayer) having the active ingredient 2-chloro-N-(ethoxymethyl)-N-(2-ethyl-6-methylphenyl) acetamide (acetochlor), Kixor® and Sharpen® (BASF), each having the active ingredient N'-{2-Chloro-4-fluoro-5-[1,2,3,6-tetrahydro-3-methyl-2,6-dioxo-4-(trifluoromethyl)pyrimidin-1-yl]benzoyl}-N-isopropyl-N-methylsulfamide (saflufenacil), and Section® Three (WinField® United) having the active ingredient clethodim.

The mechanism of action of suitable commercially available herbicides is not limited and may include, for example, Group 1 acetyl CoA carboxylase (ACCase) inhibitors, Group 5 photosystem II inhibitors (e.g., atrazine), Group 14 protoporphyrinogen oxidase (PPO) inhibitors (e.g., Sharpen®), and Group 15 long chain fatty acid inhibitors (e.g., Warrant®).

Additionally or alternatively, the pesticides may include insecticides. Examples of insecticides suitable for use with the methods disclosed herein include carbamates such as methomyl, thiodicarb, carbaryl, and oxamyl; organophosphates such as terbufos, Diazinon, naled, Dimethoate 4EC, disulfoton, phosmet, chlorpyrifos, Malathion, oxydemeton-methyl, ethoprop, methamidophos, acephate, methyl parathion, and phorate; organochlorides such as endosulfan; pyrethroids such as permethrin, esfenvalerate, beta-cyfluthrin, bifenthrin, fenpropathrin, gamma-cyhalothrin, lambda-cyhalothrin, and pyrethrins; neonicotinyls such as thiamethoxam, imidacloprid, acetamiprid, clothianidin, thiamethoxam, and dinotefuran; insect nerve poisons such as abamectin, indoxacarb, flonicamid, chlorantraniliprole, pymetrozine, emamectin benzoate, spinetoram, spinosad, and flubendiamide; insect growth regulators such as buprofezin, diflubenzuron, pyriproxyfen, (S)-methoprene, methoxyfenozide, pyriproxyfen, azadirachtin, novaluron, cyromazine, and etoxazole; and other insecticides such as bifenazate, *Bacillus thuringiensis*, Cryolite, acequinocyl, potassium salts of fatty acids, spirotetramat, *Beauveria*, spiromesifen, fenpyroximate, synthetic extract of *Chenopodium ambrosioides*, mineral oil, and Sulfur 6 L; and combinations of two or more of any of the foregoing.

Additionally or alternatively, the pesticides may include fungicides. Examples of fungicides suitable for use with the methods disclosed herein include Group 11 fungicides, pyraclostrobin, azoxystrobin, chlorothalonil, boscalid, mancozeb, strobilurin, triphenyltin hydroxide, or combinations of two or more thereof; and combinations of Group 11 fungicides with fungicides from other groups such as Group 3 and Group 7. Some examples of commercially available fungicides are PRIAXOR® XEMIUM®, a suspension concentrate blend of fluxapyroxad and pyraclostrobin (BASF® SE, Ludwigshafen am Rhein, Germany); HEADLINE®, an emulsifiable concentrate of pyraclostrobin (BASF®); HEADLINE® SC, a suspension concentrate of pyraclostrobin (BASF®); HEADLINE® AMP for corn, a blend of pyraclostrobin and metconazole (BASF®); QUILT® and QUILT® XCEL®, a blend of azoxystrobin and propiconazole (Syngenta International AG, Basel, Switzerland); and STRATEGO® and STRATEGO® YLD, a blend of propiconazole and trifloxystrobin (Bayer AG, Leverkusen, Germany).

Other pesticides may include nematocides, plant growth regulators, and animal repellents.

Additionally or alternatively, the drift reduction adjuvant compositions disclosed herein may be used with desiccants and defoliants.

The drift reduction adjuvant compositions can be used with pesticides, fertilizers, desiccants, and/or defoliants that include a surfactant, such as the sodium salt of an alkyl ether sulfate, which may be sodium lauryl ether sulfate. The surfactant may increase the volume percentage of fines in the pesticides, fertilizers, desiccants, and/or defoliants when such compositions are used alone. In implementations, combining the drift reduction adjuvant compositions with any of the pesticides, fertilizers, desiccants, and/or defoliants reduces the volume percentage of fine droplets compared to the same pesticides, fertilizers, desiccants, and/or defoliants that are not combined with the disclosed drift reduction adjuvant compositions.

An agricultural composition (e.g., pesticide) may be present in the drift reduction adjuvant compositions at about 1% to about 5% v/v, about 1% to about 4% v/v, about 1% to about 3% v/v, about 1% to about 2% v/v, about 2% to about 5% v/v, about 3% to about 5% v/v, about 4% to about 5% v/v, or about 2% to about 4% v/v.

When water in an admixture containing a drift reduction adjuvant composition and an herbicide is hard water, water conditioners such as Class Act® NG® may be admixed in order to prevent trace impurities from binding with the herbicide (e.g., precipitating). The water conditioner includes cations and anions that bind with the impurities making them unavailable for precipitating with the herbicide, and further, the water conditioner may bind to sites on the herbicide to further prevent the impurities from antagonizing the herbicide.

III. Applications of Use

The drift reduction adjuvant compositions disclosed herein may form part of an agricultural spray. The agricultural spray can include at least one drift reduction adjuvant composition comprising at least one oil emulsion or oil emulsion drift reduction adjuvant and at least one spontaneous emulsion drift reduction adjuvant, at least one agricultural composition (e.g., at least one of a pesticide, a fungicide, a herbicide, or a fertilizer), and water. The agricultural spray can be used in connection with agricultural spray applications such as spraying seeds, soil, foliage, and fruit. Sprays containing the disclosed drift reduction adjuvant compositions may be delivered using ground and/or aerial spray applications. Application may be during the vegetative state, during planting, and/or after planting to reduce drift and manage the production of fine droplets of the agricultural spray.

The agricultural sprays may be admixed prior to use. Admixing may be conducted under agitation. Admixing may be performed at about 33° F. to about 100° F., at elevated temperatures above 90° F., or at ambient temperatures (e.g., about 70° F. to 90° F., depending on climate).

In embodiments, prior to use, the drift reduction adjuvant compositions may be selected such that the agricultural spray that includes the drift reduction adjuvant composition produces fewer fines when dispensed, such as from a nozzle, than a substantially similar agricultural spray that does not include either or both of the at least one oil emulsion drift reduction adjuvant or the at least one spontaneous emulsion drift reduction adjuvant. The drift reduction adjuvant composition may be selected based on a number of different factors. For example, the drift reduction adjuvant composition may be selected based on the speed of the ambient air, the speed of the application, the direction of the ambient air relative to the spray sheet, the direction of the movement of the applicator relative to the spray sheet, the speed of the relative air flow, the angle of the relative air flow, the nozzle type, the composition or amount of the oil emulsion drift reduction adjuvant, and/or the composition or amount of the spontaneous emulsion drift reduction adjuvant.

The agricultural nozzles that may be used to spray the drift reduction adjuvant compositions or agricultural sprays that includes the drift reduction adjuvant compositions of the present disclosure may vary in size, shape, material, and other characteristics. Examples of agricultural nozzles that may be used include drift reduction nozzles, such as nozzles that produce flat fan sprays. Agricultural nozzles may include those manufactured by TeeJet (TTI 11004 nozzle, XR11002-XR TeeJet Extended Range Flat Spray Tip, AIXR11004-AIXR TeeJet Spray Tip), Hypro, Greenleaf, Wilger, Lechler. For instance TeeJet nozzle models include as AIXR, AI, TT, and so on. The nozzle classifications for the agricultural nozzles that may be used to spray the agricultural compositions include but are not limited to: extremely fine (XF), with a VMD of approximately 50 µm; very fine (VF), with a VMD of less than approximately 136 µm; fine (F), with a VMD of approximately 136-177 µm; medium (M), with a VMD of approximately 177-218 µm; ultra-coarse (C), with a VMD of approximately 218-349 µm; very ultra-coarse (VC), with a VIVID of approximately 349-428 µm; extremely ultra-coarse (EC), with a VIVID of approximately 428-622 µm; and ultra-coarse (UC), with a VIVID of greater than approximately 622 µm.

Example flow rates through the nozzles include about 0.0125 to about 2.0 gallons per minute (gpm) per nozzle, about 0.03 to about 0.1, 0.03 to about 0.09, 0.03 to about 0.06, about 0.03 to about 0.2, about 0.03 to about 0.5, about 0.03 to about 1.0, about 0.0125 to about 0.04, about 0.0125 to about 0.05 gpm, about 0.03, about 0.04, about 0.05, or about 0.06 gpm. As a specific example, the flow rate of the nozzle may be variable and may range from about 0.2 to about 1.5 gpm per nozzle.

The nozzles may deliver spray at a spray angle of about 65° to about 140°, up to about 140°, about 90°, about 100°, about 110°, about 120°, about 130° or about 140°.

The spray nozzles may be operated at up to 115 psi fluid pressure, or about 15 to about 115 psi, about 30 to about 60 psi fluid pressure, or about 15, about 20, about 30, about 40, about 50, about 60, about 70, about 80, about 90, about 100, about 110 psi fluid pressure, or any integer range of the aforementioned pressure levels (e.g., about 15 to about 60 psi).

The use of agricultural sprays including the drift reduction adjuvant compositions disclosed herein with any agricultural nozzle may help reduce the percentage of fines. However, some nozzles may more readily produce fines than other nozzles and, as such, may benefit from the drift reduction adjuvant compositions disclosed herein more than other types of nozzles.

Agricultural sprays may be dispensed from a nozzle at a rate (in gallons per acre) of about 5 to about 20, about 5 to about 15, about 5 to about 10, about 10 to about 20, about 15 to about 20, or about 10 gallons per acre.

An oil emulsion drift reduction adjuvant within an agricultural spray may be dispensed at a rate (in ounces per acre) of about 0.5 to about 6, about 0.5 to about 5, about 0.5 to about 4, about 0.5 to about 3, about 0.5 to about 2, about 1 to about 6, about 2 to about 6, about 3 to about 6, about 4 to about 6, or about 1 to about 4 ounces per acre.

A spontaneous emulsion drift reduction adjuvant may be dispensed at a rate (in ounces per acre) of about 20 to about 40, about 20 to about 35, about 20 to about 30, about 20 to about 25, about 25 to about 40, about 30 to about 40, about 35 to about 40, or about 24 to about 32 ounces per acre.

An agricultural composition within an agricultural spray may be dispensed at a rate (in ounces per acre) of about 20 to about 40, about 20 to about 35, about 20 to about 30, about 20 to about 25, about 25 to about 40, about 30 to about 40, about 35 to about 40, or about 27 to about 31 ounces per acre, or about 29 ounces per acre.

In an embodiment, an agricultural spray that includes a drift reduction adjuvant composition disclosed herein may produce a lower volume percentage of fines when the agricultural spray is dispensed, such as from a nozzle, than a substantially similar agricultural spray that does not include the drift reduction adjuvant compositions disclosed herein delivered under the same conditions (e.g., delivered from the same nozzle at the same pressure and flow rate). It is noted that the substantially similar agricultural spray that does not include the drift reduction adjuvant compositions disclosed herein can include an oil emulsion or oil emulsion drift reduction adjuvant in the absence of a spontaneous emulsion drift reduction adjuvant, or can include a spontaneous emulsion drift reduction adjuvant in the absence of an oil emulsion or oil emulsion drift reduction adjuvant. Without being limited to any mechanism or mode of action, the combination of oil emulsion and spontaneous emulsion drift reduction adjuvant may help reduce the production of fines in an agricultural spray compared to an agricultural spray that includes neither or only one of an oil emulsion or spontaneous emulsion drift reduction adjuvant.

As an example, the agricultural spray including the drift reduction adjuvant compositions disclosed herein may decrease the volume percentage of fines, such as those <150 μm, by up to about 95% compared to a substantially similar agricultural spray that does not include the drift reduction adjuvant compositions disclosed herein. The agricultural spray including the drift reduction adjuvant compositions disclosed herein may decrease the volume percentage of fines by about 35% to about 95%, about 35% to about 90%, about 35% to about 85%, about 35% to about 80%, about 35% to about 75%, about 35% to about 70%, about 35% to about 65%, about 35% to about 60%, about 35% to about 55%, about 35% to about 50%, about 35% to about 45%, about 40% to about 95%, about 45% to about 95%, about 50% to about 95%, about 55% to about 95%, about 60% to about 95%, about 65% to about 95%, about 70% to about 95%, about 75% to about 95%, about 80% to about 95%, about 85% to about 95%, about 40% to about 85%, about 64% to about 80%, about 64% to about 78%, or about 40% to about 43% compared to a substantially similar agricultural spray that does not include the drift reduction adjuvant compositions disclosed herein.

As an example, the agricultural spray including the drift reduction adjuvant compositions disclosed herein may reduce the number of fine droplets, such as those having a diameter <150 μm, by at least about 1 percentage point compared to a substantially similar agricultural spray that does not include the drift reduction adjuvant compositions disclosed herein. The agricultural spray including the drift reduction adjuvant compositions disclosed herein may reduce the number of fine droplets, such as those having a diameter <150 μm, by about 1 percentage point to about 15 percentage points, about 1 percentage point to about 13 percentage points, about 1 percentage point to about 11 percentage points, about 1 percentage point to about 9 percentage points, about 1 percentage point to about 7 percentage points, about 1 percentage point to about 5 percentage points, about 3 percentage points to about 15 percentage points, about 5 percentage points to about 15 percentage points, about 7 percentage point to about 15 percentage points, about 9 percentage points to about 15 percentage points, about 11 percentage points to about 15 percentage points, about 2 percentage points to about 11 percentage points, about 5 percentage points to about 8 percentage points, about 8 percentage points to about 11 percentage points, compared to a substantially similar agricultural spray that does not include the drift reduction adjuvant compositions disclosed herein.

EXAMPLES

The following examples provide further detail in connection with the specific embodiments described above. The examples are not meant to be limiting.

Example 1

Agricultural sprays were prepared with one or more herbicide and/or drift reduction adjuvant components in 9 treatment combinations plus a water control. Each treatment was prepared as a 7 L batch and the volume of each component in each treatment (the balance as water) is set forth in Table 1 below.

InterLock® is an oil emulsion drift reduction adjuvant. AccuDrop® is a surfactant-based drift reduction adjuvant. Enlist One® contains a spontaneous emulsion drift reduction adjuvant and the herbicide 2,4-dichlorophenoxyacetic acid as a choline salt. Liberty® is a glufosinate ammonium-based soluble liquid herbicide. The component use rates, in ounces per acre, of each component are: Enlist One®—24 oz./a, Liberty®—29 oz./a, InterLock®—4 oz./a, Accudrop®—3 oz./a. The use rates are set forth in mL in Table 1 below. The product use rate of each treatment was 10 gallons per acre.

Each of the 10 treatments was tested (n=5) in a wind tunnel. The nozzle of the testing section was a TeeJet AIXR11004 spray tip. Each spray was emitted from the nozzle at 40 pounds per square inch. The air flowing through the test section of the tunnel was held at a constant speed of 15 mph. The spray fan exiting the nozzle was emitted at 110°. The angle between the spray and coflowing air was 0°. A Sympatec Helos KR laser diffraction system with R7 Lens was used to measure spray traverse through measurement volume to measure droplet size.

Results are presented in Table 1 as the average percent of the spray volume having a droplet size less than 150 μm. The standard deviation ("Std. Dev.") of each test treatment measurement is also presented. The data, except for Treatment 10 (Water), was analyzed using a post-hoc sorting of the ANOVA output using a multiple comparison with the Tukey-Kramer honestly significant difference (HSD) criteria at a significance of 0.05. Different letters indicate statistically different values at a 95% confidence level.

TABLE 1

| Treatment | Component (Volumes in mL) | | | Average % Spray Volume < 150 μm | Std. Dev. |
| --- | --- | --- | --- | --- | --- |
| | A | B | C | | |
| 1 | InterLock (22) | | | 1.39$^a$ | 0.05 |
| 2 | AccuDrop® (16) | | | 1.74$^a$ | 0.08 |
| 3 | Enlist One® (131) | | | 1.66$^a$ | 0.01 |
| 4 | Liberty® (159) | | | 9.01$^d$ | 0.48 |
| 5 | Enlist One® (131) | Liberty® (159) | | 4.18$^b$ | 0.05 |
| 6 | Enlist One® (131) | Liberty® (159) | InterLock® (22) | 1.75$^a$ | 0.09 |
| 7 | InterLock® (159) | Liberty® (22) | | 8.32$^c$ | 0.25 |
| 8 | Liberty® (159) | AccuDrop® (16) | | 8.74$^{cd}$ | 0.41 |
| 9 | Enlist One® (131) | Liberty® (159) | AccuDrop® (16) | 4.39$^b$ | 0.07 |
| 10 | Water (7000) | | | 2.2 | |

All treatments exhibited low standard deviations for 5 replicates, which demonstrates that the results are repeatable.

The results demonstrate that the treatment with Liberty® alone (Treatment 4) had the highest volume percentage of fines (9.01%), which was statistically different than each of InterLock® alone (Treatment 1), AccuDrop® alone (Treatment 2), and Enlist One® alone (Treatment 3).

Adding AccuDrop® to Liberty® (Treatment 8) produced a spray in which 8.74% of the volume included droplets less than 150 μm in diameter. The reduction in fines compared to Liberty® alone (i.e., 9.01%) was minimal and not statistically different than Liberty® alone. AccuDrop® is a drift reduction adjuvant and, when added to Liberty®, had been expected to reduce the percentage of fines back to the level of AccuDrop® alone (i.e., 1.74%; Treatment 2).

Adding InterLock® to Liberty® (Treatment 7) produced a spray in which 8.32% of the volume included droplets less than 150 μm in diameter. The addition of InterLock® reduced fines by 7.7% compared to Liberty alone (i.e., 9.01%), which is a statistically significant difference. However, InterLock® is a drift reduction adjuvant and, when added to Liberty®, had been expected to reduce the percentage of fines back to the level of InterLock® alone (i.e., 1.39%; Treatment 1).

Adding Enlist One® to Liberty® (Treatment 5) produced a spray in which 4.18% of the volume included droplets less than 150 μm in diameter. Although Enlist One® containing the spontaneous emulsion drift reduction adjuvant reduced the volume of fines by 53.6% compared to Liberty® alone (Treatment 4, 9.01%), the reduction did not approach the low level of fines observed with Enlist One® alone (e.g., 1.66%; Treatment 3). Enlist One® is a drift reduction adjuvant and, when added to Liberty®, had been expected to reduce the percentage of fines back to the level of Enlist One® alone (i.e., 1.66%).

Adding both AccuDrop® and Enlist One® to Liberty® (Treatment 9) produced an agricultural spray in which 4.39% of the volume included droplets less than 150 μm in diameter. The addition of both AccuDrop® and Enlist One® reduced fines only slightly more, and not to a statistically meaningful extent, than Enlist One® did alone with Liberty® (i.e. 4.18%, Treatment 5).

Surprisingly, adding both InterLock® and Enlist One® to Liberty® (Treatment 6) produced an agricultural spray in which 1.75% of the volume included droplets less than 150 μm in diameter. The addition of both InterLock® and Enlist One® reduced fines by about 7.26 percentage points compared to Liberty® alone. The addition of both InterLock® and Enlist One® reduced fines by about 80.6% compared to Liberty® alone (i.e., 9.01%). The combination of InterLock® and Enlist One® with Liberty® reduced the fines to a volume percent (i.e., 1.75%) approximate to, and not statistically different from, Enlist One® alone (i.e., 1.66%).

Example 2

Agricultural sprays were prepared with one or more herbicide and/or drift reduction adjuvant components in 20 treatment combinations plus a water control. Each treatment was prepared as a 7 L batch and the volume of each component in each treatment (the balance as water) is set forth in Table 2 below. Enlist One® ("EO") is a product that contains a spontaneous drift reduction emulsion and includes the herbicide 2,4-dichlorophenoxyacetic acid as a choline salt. InterLock® ("IL") is an oil emulsion drift reduction adjuvant. Liberty® ("L") is a glufosinate ammonium-based herbicide. The component use rates, in ounces per acre, of each component are set forth in Table 3 below. The product use rate of each treatment was 10 gallons per acre.

TABLE 2

| Treatment | Component (Volume in mL) A | B | C |
|---|---|---|---|
| 1 | Enlist One ® (131) | | |
| 2 | Enlist One ® (175) | | |
| 3 | InterLock ® (5) | | |
| 4 | InterLock ® (11) | | |
| 5 | InterLock ® (16) | | |
| 6 | InterLock ® (22) | | |
| 7 | Liberty ® (159) | | |
| 8 | Enlist One ® (131) | InterLock ® (5) | |
| 9 | Enlist One ® (131) | InterLock ® (11) | |
| 10 | Enlist One ® (131) | InterLock ® (16) | |
| 11 | Enlist One ® (131) | InterLock ® (22) | |
| 12 | Enlist One ® (131) | Liberty ® (159) | |
| 13 | Enlist One ® (131) | InterLock ® (5) | Liberty ® (159) |
| 14 | Enlist One ® (131) | InterLock ® (11) | Liberty ® (159) |
| 15 | Enlist One ® (131) | InterLock ® (16) | Liberty ® (159) |
| 16 | Enlist One ® (131) | InterLock ® (22) | Liberty ® (159) |
| 17 | Enlist One ® (175) | Liberty ® (159) | |
| 18 | Water (7000) | | |
| 19 | Liberty ® (159) | InterLock ® (11) | |
| 20 | Liberty ® (159) | InterLock ® (16) | |
| 21 | Liberty ® (159) | InterLock ® (22) | |

Each of the 21 treatments was tested (n=5) in a wind tunnel. The nozzle of the testing section was a TeeJet AIXR11004 spray tip. Each spray was emitted from the nozzle at 40 pounds per square inch. The air flowing through the test section of the tunnel was held at a constant speed of 15 mph. The spray fan exiting the nozzle was emitted at 110°. The angle between the spray and coflowing air was 0°. A Sympatec Helos KR laser diffraction system with R7 Lens was used to measure spray traverse through measurement volume to measure droplet size.

Results are presented in Table 3 as the average percent of the spray volume having a droplet size less than 105 μm, less than 150 µm, and less than 210 µm. The standard deviation ("Std. Dev.") of each measurement is also presented. The data was analyzed using a post-hoc sorting of the ANOVA output using a multiple comparison with the Tukey-Kramer HSD criteria at a significance of 0.05. Different letters indicate statistically different values, at a given droplet size, at a 95% confidence level.

sprayed at 24 oz./a; Treatment 1). Enlist One® is a drift reduction adjuvant and, when added to Liberty®, had been expected to reduce the percentage of fines back to the level of Enlist One® alone (i.e., 1.71%). Increasing the rate of Enlist One® by 25% from 24 oz./a (Treatment 12) to 32 oz./acre (Treatment 17) did not reduce the fines to a significant degree.

TABLE 3

| Trt. | Component (Rate in oz./a) | | | Avg. % Spray Volume < 105 µm | Std. Dev. | Avg. % Spray Volume < 150 µm | Std. Dev. | Avg. % Spray Volume < 210 µm | Std. Dev. |
|---|---|---|---|---|---|---|---|---|---|
| | A | B | C | | | | | | |
| 1 | EO (24) | | | $0.40^{abc}$ | 0.04 | $1.71^{de}$ | 0.07 | $5.55^{de}$ | 0.11 |
| 2 | EO (32) | | | $0.44^{bc}$ | 0.04 | $1.80^{e}$ | 0.06 | $5.77^{ef}$ | 0.08 |
| 3 | IL (1) | | | $0.36^{ab}$ | 0.07 | $1.42^{abc}$ | 0.14 | $4.42^{ab}$ | 0.22 |
| 4 | IL (2) | | | $0.37^{ab}$ | 0.09 | $1.44^{abcd}$ | 0.20 | $4.42^{ab}$ | 0.30 |
| 5 | IL (3) | | | $0.30^{a}$ | 0.02 | $1.23^{a}$ | 0.06 | $3.88^{a}$ | 0.09 |
| 6 | IL (4) | | | $0.33^{ab}$ | 0.04 | $1.34^{ab}$ | 0.11 | $4.15^{a}$ | 0.16 |
| 7 | L (29) | | | $3.08^{i}$ | 0.15 | $7.81^{j}$ | 0.32 | $16.87^{k}$ | 0.61 |
| 8 | EO (24) | IL (1) | | $0.35^{ab}$ | 0.02 | $1.55^{bcde}$ | 0.07 | $5.15^{cd}$ | 0.16 |
| 9 | EO (24) | IL (2) | | $0.33^{ab}$ | 0.02 | $1.47^{abcd}$ | 0.06 | $4.95^{bc}$ | 0.16 |
| 10 | EO (24) | IL (3) | | $0.33^{ab}$ | 0.01 | $1.46^{abcd}$ | 0.03 | $4.93^{bc}$ | 0.06 |
| 11 | EO (24) | IL (4) | | $0.33^{ab}$ | 0.01 | $1.44^{abcd}$ | 0.04 | $4.89^{bc}$ | 0.09 |
| 12 | EO (24) | L (29) | | $1.49^{gh}$ | 0.03 | $4.62^{i}$ | 0.11 | $11.76^{j}$ | 0.28 |
| 13 | EO (24) | IL (1) | L (29) | $0.68^{e}$ | 0.02 | $2.76^{g}$ | 0.07 | $8.47^{i}$ | 0.17 |
| 14 | EO (24) | IL (2) | L (29) | $0.54^{cd}$ | 0.01 | $2.26^{f}$ | 0.04 | $7.32^{h}$ | 0.14 |
| 15 | EO (24) | IL (3) | L (29) | $0.39^{ab}$ | 0.05 | $1.79^{e}$ | 0.10 | $6.16^{fg}$ | 0.11 |
| 16 | EO (24) | IL (4) | L (29) | $0.37^{ab}$ | 0.02 | $1.70^{cde}$ | 0.05 | $5.89^{efg}$ | 0.08 |
| 17 | EO (32) | L (29) | | $1.41^{fg}$ | 0.05 | $4.44^{hi}$ | 0.09 | $11.54^{j}$ | 0.19 |
| 18 | Water | | | $0.66^{de}$ | 0.03 | $2.30^{f}$ | 0.07 | $6.37^{g}$ | 0.16 |
| 19 | L (29) | IL (2) | | $1.54^{h}$ | 0.10 | $4.62^{i}$ | 0.19 | $11.66^{j}$ | 0.34 |
| 20 | L (29) | IL (3) | | $1.53^{gh}$ | 0.05 | $4.62^{i}$ | 0.08 | $11.71^{j}$ | 0.37 |
| 21 | L (29) | IL (4) | | $1.35^{f}$ | 0.11 | $4.29^{h}$ | 0.14 | $11.22^{j}$ | 0.21 |

All treatments exhibited low standard deviations for 5 replicates, which demonstrates that the results are repeatable.

The results demonstrate that the treatment with Liberty® (L) alone sprayed at a rate of 29 ounces per acre (oz./a) (Treatment 7) had the highest volume percentage of fines, regardless of the droplet diameter measured. For example, 7.81% of the spray volume of Treatment 7 had fines measuring less than 150 µm in diameter.

Adding InterLock® (IL) sprayed at a rate of 4 oz./a to Liberty® (Treatment 21) produced a spray in which 4.29% of the volume included droplets less than 150 µm in diameter. Although InterLock® significantly reduced the volume of fines compared to Liberty® alone (Treatment 7, 7.81%), its addition did not approach, and was statistically different from, the low level of fines observed with InterLock® alone (e.g., 1.34% having a diameter <150 µm when sprayed at 4 oz./a; Treatment 6). InterLock® is a drift reduction adjuvant and, when added to Liberty®, had been expected to reduce the percentage of fines back to the level of InterLock® alone (i.e., 1.34%). Increasing the rate of InterLock® by 50% from 2 oz./a (Treatment 19) to 3 oz./a (Treatment 20) or by 100% to 4 oz./a (Treatment 21) did not reliably reduce the fines to a statistically meaningful extent, especially for droplets having a diameter <210 µm.

Adding Enlist One® (EO) sprayed at a rate of 24 oz./acre to Liberty® (Treatment 12) produced a spray in which 4.62% of the volume included droplets less than 150 µm in diameter. Although Enlist One® significantly reduced the volume of fines compared to Liberty® alone (Treatment 7, 7.81%), its addition did not approach, and was statistically different from, the low level of fines observed with Enlist One® alone (e.g., 1.71% having a diameter <150 µm when sprayed at 24 oz./a; Treatment 1). Enlist One® is a drift reduction adjuvant and, when added to Liberty®, had been expected to reduce the percentage of fines back to the level of Enlist One® alone (i.e., 1.71%). Increasing the rate of Enlist One® by 25% from 24 oz./a (Treatment 12) to 32 oz./acre (Treatment 17) did not reduce the fines to a significant degree.

Surprisingly, adding both InterLock® sprayed at a rate of 4 oz./a and Enlist One® sprayed at a rate of 24 oz./a to Liberty® (Treatment 16) produced an agricultural spray in which 1.70% of the volume included droplets less than 150 µm in diameter.

The addition of both InterLock® and Enlist One® significantly reduced fines <150 µm by about 5.05 percentage points to about 6.11 percentage points [for 1 oz./a of InterLock® (Treatment 13) to 4 oz./a of InterLock® (Treatment 16), respectively] compared to Liberty® alone (Treatment 7). The addition of both InterLock® and Enlist One® significantly reduced fines <150 µm by about 64.7% to about 78.2% [for 1 oz./a of InterLock® (Treatment 13) to 4 oz./a of InterLock® (Treatment 16), respectively] compared to Liberty® alone (Treatment 7).

The addition of both InterLock® and Enlist One® significantly reduced fines <105 µm by about 2.40 percentage points to about 2.71 percentage points [for 1 oz./a of InterLock® (Treatment 13) to 4 oz./a of InterLock® (Treatment 16), respectively] compared to Liberty® alone (Treatment 7). The addition of both InterLock® and Enlist One® significantly reduced fines <105 µm by about 77.9% to about 88.0% [for 1 oz./a of InterLock® (Treatment 13) to 4 oz./a of InterLock® (Treatment 16), respectively] compared to Liberty® alone (Treatment 7).

The addition of both InterLock® and Enlist One® significantly reduced fines <210 µm by about 8.40 percentage points to about 10.98 percentage points [for 1 oz./a of InterLock® (Treatment 13) to 4 oz./a of InterLock® (Treatment 16), respectively] compared to Liberty® alone (Treatment 7). The addition of both InterLock® and Enlist One® significantly reduced fines <210 µm by about 50.0% to about 65.1% [for 1 oz./a of InterLock® (Treatment 13) to 4 oz./a of InterLock® (Treatment 16), respectively] compared to Liberty® alone (Treatment 7).

The combination of InterLock® and Enlist One® with Liberty® reduced fines <150 µm to a volume percent (i.e., 1.70%) not statistically different from Enlist One® alone (i.e., 1.71%). The combination of InterLock® and Enlist One® with Liberty® reduced the fines to a volume percent (i.e., 1.70%) not statistically different from the combination of InterLock® (again at 4 oz./a) and Enlist One® (again at 24 oz./a) in the absence of Liberty® (i.e., 1.44% having a diameter <150 µm; Treatment 11).

Surprisingly, in treatments having InterLock®, Enlist One®, and Liberty®, decreasing the spray rate of InterLock® by 25% from 4 oz./a (Treatment 16) to 3 oz./a (Treatment 15) maintained the reduction in fines, regardless of the droplet diameter measured (e.g., 1.70% and 1.79%, respectively, for fines <150 µm, which are not statistically different). Decreasing the spray rate of InterLock® by 50% to 2 oz./a (Treatment 14) or by 75% to 1 oz./a (Treatment 13) also significantly reduced fines (e.g., 2.26% and 2.76%, respectively, for fines <150 µm) compared to Liberty® alone (e.g., 7.8% for fines <150 µm).

The results demonstrate that the treatment with Enlist One® alone sprayed at a rate of 24 oz./a (Treatment 1) produced a spray in which 1.71% of the volume included droplets less than 150 µm in diameter.

Adding InterLock® sprayed at a rate of 4 oz./a to Enlist One® sprayed at the same rate of 24 oz./a (Treatment 11) produced a spray in which 1.44% of the volume included droplets less than 150 μm in diameter. Accordingly, the addition of the drift reduction adjuvant InterLock® negligibly reduced fines by 0.27 percentage point, which is not statistically significant reduction. In some implementations, a user may decline to add an oil emulsion drift reduction adjuvant, such as InterLock®, to an herbicide/drift reduction emulsion (or components thereof) contained in Enlist One® or Enlist Duo® as a drift reduction adjuvant (e.g., spontaneous emulsion drift reduction adjuvant), because the reduction in fines is not measurable enough to justify the increased cost.

Adding Liberty® sprayed at a rate of 29 oz./a to Enlist One® sprayed at the same rate of 24 oz./a (Treatment 12) produced a spray in which 4.62% of the volume included droplets less than 150 μm in diameter. Accordingly, the addition of the herbicide Liberty® significantly increased fines by almost 3 percentage points. In some implementations, a user may decline to add a second herbicide, such as Liberty®, to an herbicide/spontaneous emulsion drift reduction adjuvant contained in Enlist One® or Enlist Duo®, because the increase in fines is too great to apply the treatment accurately and safely.

Surprisingly, adding both InterLock® and Liberty® to Enlist One® (all sprayed at the same rates of 4 oz./a, 29 oz./a, and 24 oz./a, respectively; Treatment 16) produced a spray in which 1.70% of the volume included droplets less than 150 μm in diameter. The combination of InterLock® and Liberty® with Enlist One® reduced the fines to a volume percent (i.e., 1.70%) not statistically different from Enlist One® alone (i.e., 1.71%).

Example 3

Agricultural sprays were prepared with at least one drift reduction adjuvant component and at least one herbicide in 8 treatment combinations. Each treatment was prepared as a 7 L batch and the volume of each component in each treatment (the balance as water) is set forth in Table 4 below. Enlist One® ("EO") is a product that contains a spontaneous drift reduction emulsion and includes the herbicide 2,4-dichlorophenoxyacetic acid as a choline salt. InterLock® ("IL") is an oil emulsion drift reduction adjuvant. The tested herbicides were atrazine ("A") (provided as a suspension concentrate), Sharpen® ("S") (a saflufenacil-based emulsifiable concentrate), Section® Three ("ST") (a clethodim-based emulsifiable concentrate), and Warrant® ("W") (an acetochlor-based suspension concentrate).

TABLE 4

| | Component (Volume in mL) | | |
|---|---|---|---|
| Treatment | A | B | C |
| 1 | Enlist One ® (131) | Atrazine (88) | |
| 2 | Enlist One ® (131) | Atrazine (88) | InterLock ® (16) |
| 3 | Enlist One ® (131) | Sharpen ® (16) | |
| 4 | Enlist One ® (131) | Sharpen ® (16) | InterLock ® (16) |
| 5 | Enlist One ® (131) | Section ® Three (33) | |
| 6 | Enlist One ® (131) | Section ® Three (33) | InterLock ® (16) |
| 7 | Enlist One ® (131) | Warrant ® (263) | |
| 8 | Enlist One ® (131) | Warrant ® (263) | InterLock ® (16) |

The component use rates, in ounces per acre, of each component are set forth in Table 5 below. The product use rate of each treatment was 10 gallons per acre.

Each of the 8 treatments was tested (n=5) in a wind tunnel. The nozzle of the testing section was a TeeJet AIXR11004 spray tip. Each spray was emitted from the nozzle at 40 pounds per square inch. The air flowing through the test section of the tunnel was held at a constant speed of 15 mph. The spray fan exiting the nozzle was emitted at 110°. The angle between the spray and coflowing air was 0°. A Sympatec Helos KR laser diffraction system with R7 Lens was used to measure spray traverse through measurement volume to measure droplet size.

Results are presented in Table 5 as the average percent of the spray volume having a droplet size less than 105 μm, less than 150 μm, and less than 210 μm. The standard deviation ("Std. Dev.") of each test treatment measurement is also presented. The data was analyzed using a post-hoc sorting of the ANOVA output using a multiple comparison with the Tukey-Kramer HSD criteria at a significance of 0.05. Different letters indicate statistically different values, at a given droplet size, at a 95% confidence level.

TABLE 5

| | Component (Rate in oz./a) | | | Avg. % Spray Volume < | Std. | Avg. % Spray Volume < | Std. | Avg. % Spray Volume < | Std. |
|---|---|---|---|---|---|---|---|---|---|
| Trt. | A | B | C | 105 μm | Dev. | 150 μm | Dev. | 210 μm | Dev. |
| 1 | EO (24) | A (16) | | $0.38^{b}$ | 0.01 | $1.64^{c}$ | 0.02 | $5.25^{c}$ | 0.04 |
| 2 | EO (24) | A (16) | IL (3) | $0.35^{a}$ | 0.03 | $1.47^{a}$ | 0.07 | $4.77^{a}$ | 0.12 |
| 3 | EO (24) | S (3) | | $0.54^{d}$ | 0.01 | $2.06^{e}$ | 0.02 | $6.27^{e}$ | 0.05 |

TABLE 5-continued

| | Component (Rate in oz./a) | | | Avg. % Spray Volume < 105 μm | Std. Dev. | Avg. % Spray Volume < 150 μm | Std. Dev. | Avg. % Spray Volume < 210 μm | Std. Dev. |
|---|---|---|---|---|---|---|---|---|---|
| Trt. | A | B | C | | | | | | |
| 4 | EO (24) | S (3) | IL (3) | 0.34[a] | 0.02 | 1.52[ab] | 0.05 | 5.06[b] | 0.11 |
| 5 | EO (24)) | ST (6) | | 0.35[a] | 0.01 | 1.55[ab] | 0.03 | 5.14[bc] | 0.07 |
| 6 | EO (24) | ST (6) | IL (3) | 0.35[a] | 0.01 | 1.55[ab] | 0.05 | 5.12[bc] | 0.14 |
| 7 | EO (24) | W (48) | | 0.49[c] | 0.01 | 1.92[d] | 0.02 | 6.08[d] | 0.05 |
| 8 | EO (24) | W (48) | IL (3) | 0.36[ab] | 0.02 | 1.59[bc] | 0.04 | 5.26[c] | 0.07 |

All treatments exhibited low standard deviations for 5 replicates, which demonstrates that the results are repeatable.

The results demonstrate that the addition of InterLock® (IL) to the combination of Enlist One® ("EO") and each of atrazine ("A"), Sharpen® ("S"), and Warrant® ("W") significantly decreased the volume percentage of fine particles having a diameter <105 μm, <150 μm, and <210 μm. For example, the addition of InterLock® to the combination of Enlist One® and atrazine significantly reduced the percentage of fine particles having a diameter of <150 μm by 10% (compare Treatments 1 and 2). The addition of InterLock® to the combination of Enlist One® and Sharpen® significantly reduced the percentage of fine particles having a diameter of <150 μm by 26% (compared Treatments 3 and 4). The addition of InterLock® to the combination of Enlist One® and Sharpen® ("S") (saflufenacil-based), Section® Three ("ST") (clethodim-based), and Warrant® significantly reduced the percentage of fine particles having a diameter of <150 μm by 17% (compared Treatments 7 and 8).

The combination of Enlist One® and Section® Three produced the lowest volume percentage of fine particles having a diameter <105 μm, <150 μm, and <210 μm compared to all other tested combinations of Enlist One® and an herbicide. The addition of InterLock® to the combination of Enlist One® and Section® Three did not significantly increase or decrease the volume percentage of fine particles having a diameter <105 μm, <150 μm, or <210 μm. Without being limited to any mechanism or mode of action, the addition of InterLock® to a combination of a spontaneous drift reduction emulsion (Enlist One®) and an herbicide (Section® Three) may not appreciably reduce the volume of fine particles when the combination of spontaneous drift reduction emulsion and herbicide already produces a low volume percentage of fine particles.

The addition of InterLock® to a combination of Enlist One® and any tested herbicide did not increase the volume percentage of fine particles.

It is believed that the present disclosure and many of its advantages will be understood by the foregoing description, and various changes may be made in the form, construction and arrangement of the components without departing from the disclosed subject matter. The form described is merely explanatory, and it is the intention of the following claims to encompass and include such changes.

While the present disclosure has been described with reference to various embodiments, it will be understood that these embodiments are illustrative and that the scope of the disclosure is not limited to them. These and other variations, modifications, additions, and improvements may fall within the scope of the disclosure as defined in the claims that follow.

What is claimed is:

1. A method of reducing fines from an agricultural spray, the method comprising:
    spraying the agricultural spray, the agricultural spray comprising:
        water;
        at least one oil emulsion drift reduction adjuvant;
        at least one spontaneous emulsion drift reduction adjuvant present at about 1% to about 5% v/v; and
        at least one agricultural composition;
    wherein the agricultural spray exhibits fewer fine droplets having a diameter less than about 210 μm than a substantially similar agricultural spray that does not include either or both of the at least one oil emulsion drift reduction adjuvant or the spontaneous emulsion drift reduction adjuvant.

2. The method of claim 1, wherein the agricultural spray is sprayed from a nozzle.

3. The method of claim 1, wherein the at least one oil emulsion drift reduction adjuvant includes an oil selected from the group consisting of vegetable oil, modified vegetable oil, seed oil, modified seed oil ("MSO"), modified soybean oil, modified palm oil, modified rapeseed oil, crop oil concentrate, petroleum hydrocarbons, mineral oil, paraffinic oil, naphthenic oil, aromatic oil, emulsified petroleum distillates, unsaturated fatty acids, paraffin oil, tall oil, phytoblend-based oil, and tallow oil.

4. The method of claim 3, wherein the oil is vegetable oil or modified vegetable oil.

5. The method of claim 1, wherein the oil emulsion drift reduction adjuvant is present at about 0.05% to about 0.5% v/v.

6. The method of claim 1, wherein the spontaneous emulsion drift reduction adjuvant comprises a Pickering emulsion component.

7. The method of claim 6, wherein the Pickering emulsion component comprises one or more of carnauba wax, paraffin/ethylene acrylic acid copolymer, polyethylene, paraffin wax, ethylene acrylic acid copolymer, and styrene-butadiene latex.

8. The method of claim 1, wherein the spontaneous emulsion drift reduction adjuvant includes a pesticide.

9. The method of claim 8, wherein the agricultural composition includes added pesticide.

10. The method of claim 8, wherein the pesticide is a herbicide comprising glufosinate or glufosinate ammonium.

11. The method of claim 1, wherein the agricultural composition includes at least one alkyl ether sulfate or a salt thereof.

12. The method of claim 11, wherein the alkyl ether sulfate or salt thereof includes sodium lauryl ether sulfate.

13. The method of claim 1, wherein the fine droplets have a diameter less than about 150 μm.

14. The method of claim 13, wherein the fine droplets have a diameter less than about 105 μm.

15. A method of reducing drift of an agricultural spray, the method comprising:
- dispensing the agricultural spray from a nozzle, the agricultural spray comprising:
  - water;
  - at least one oil emulsion drift reduction adjuvant present at about 0.05% to about 0.5% v/v of the agricultural spray;
  - at least one spontaneous emulsion drift reduction adjuvant present at about 1% to about 5% v/v of the agricultural spray; and
  - at least one agricultural composition comprising at least one pesticide;
- wherein the agricultural spray exhibits fewer fine droplets having a diameter less than about 210 μm than a substantially similar agricultural spray that does not include either or both of the at least one oil emulsion drift reduction adjuvant or the at least one spontaneous emulsion drift reduction adjuvant.

16. The method of claim 15, wherein the pesticide is an herbicide and the agricultural composition includes a surfactant.

17. The method of claim 16, wherein the surfactant is an alkyl ether sulfate.

* * * * *

UNITED STATES PATENT AND TRADEMARK OFFICE
CERTIFICATE OF CORRECTION

| | |
|---|---|
| PATENT NO. | : 11,737,455 B2 |
| APPLICATION NO. | : 17/081487 |
| DATED | : August 29, 2023 |
| INVENTOR(S) | : Joe V. Gednalske et al. |

It is certified that error appears in the above-identified patent and that said Letters Patent is hereby corrected as shown below:

In the Specification

In Column 10, Line 30 delete ""VIVID"" and replace with --VMD--
In Column 10, Line 31 delete ""VIVID"" and replace with --VMD--
In Column 10, Line 33 delete ""VIVID"" and replace with --VMD--

Signed and Sealed this
Twenty-seventh Day of February, 2024

Katherine Kelly Vidal
*Director of the United States Patent and Trademark Office*